United States Patent
Pero, III

(10) Patent No.: US 9,694,897 B2
(45) Date of Patent: Jul. 4, 2017

(54) SYSTEM FOR MANUFACTURE OF FOAM SHEETS RIGIDIZED WITH POLYMER INFILTRATION

(71) Applicant: Michael A. Pero, III, Wood Ridge, NJ (US)

(72) Inventor: Michael A. Pero, III, Wood Ridge, NJ (US)

( * ) Notice: Subject to any disclaimer, the term of this patent is extended or adjusted under 35 U.S.C. 154(b) by 0 days.

(21) Appl. No.: 15/065,601

(22) Filed: Mar. 9, 2016

(65) Prior Publication Data
US 2016/0273212 A1    Sep. 22, 2016

Related U.S. Application Data

(60) Provisional application No. 62/177,656, filed on Mar. 20, 2015, provisional application No. 62/172,059, (Continued)

(51) Int. Cl.
*B64C 1/40*    (2006.01)
*B29C 44/02*    (2006.01)
(Continued)

(52) U.S. Cl.
CPC ............. *B64C 1/40* (2013.01); *B29C 44/02* (2013.01); *E04C 2/205* (2013.01); *B29C 67/202* (2013.01);
(Continued)

(58) Field of Classification Search
CPC B64C 1/40; E04C 2/205; B29C 44/02; B29C 67/202; B29K 2105/041;
(Continued)

(56) References Cited

U.S. PATENT DOCUMENTS 3,041,193 A * 6/1962 Edwards ................. B29C 44/32
156/154
3,432,449 A * 3/1969 Deal ....................... B32B 27/00
521/145
(Continued)

FOREIGN PATENT DOCUMENTS

CN    201818008    5/2011    ............. A47B 96/20
CN    103265776 A    8/2013    ............... B29B 7/74
(Continued)

OTHER PUBLICATIONS

'Vacuum Assisted Resin Transfer Molding of Foam Sandwich Composite Materials: Process Development and Model Verification' by Rebecca Ann McGrane for Virginia Polytechnic Institute. Found at: https://vtechworks.lib.vt.edu/bitstream/handle/10919/42108/McGrane2.pdf?sequence=1&isAllowed=y.
(Continued)

*Primary Examiner* — Brent W Herring
(74) *Attorney, Agent, or Firm* — Ernest D. Buff & Associates, LLC; Ernest D. Buff, Esq.; Margaret A. LaCroix, Esq.

(57) ABSTRACT

A rigid polymer porous material sheet is produced by feeding a slurry of polymer mixture comprising ultrafine polyvinylchloride particle, non-phthalate plasticizer, foaming agent and thermal stabilizer, polymer chips, fillers and fire retardant chemicals into a heated mold and pressing the mixture with high applied pressure. The temperature of the mold is below 190° C. to soften the polymer mixture and decompose the foaming agent forming the closed cell polyvinylchloride foam with 10 to 40% density with closed air cells. The thermal resistance of the rigid polymer porous sheet and sound attenuation properties are significantly improved. The rigid polymer porous sheet can be bent at sharp angles without crack formation facilitating its use as wall boards. The sheets produced may be embossed or
(Continued)

molded to produce decoration boards, advertising boards, cabinet doors and furniture with decorative features. They can also be used in aeronautical applications as acoustic thermal insulation systems.

17 Claims, 10 Drawing Sheets

Related U.S. Application Data filed on Jun. 6, 2015, provisional application No. 62/174,462, filed on Jun. 11, 2015.

(51) Int. Cl.
| | | |
|---|---|---|
| *E04C 2/20* | (2006.01) | |
| *B29K 27/06* | (2006.01) | |
| *B29K 105/00* | (2006.01) | |
| *B29K 105/04* | (2006.01) | |
| *B29C 67/20* | (2006.01) | |

(52) U.S. Cl.
CPC .. *B29K 2027/06* (2013.01); *B29K 2105/0026* (2013.01); *B29K 2105/0038* (2013.01); *B29K 2105/0044* (2013.01); *B29K 2105/041* (2013.01); *B29K 2105/046* (2013.01); *B29K 2995/0015* (2013.01)

(58) Field of Classification Search
CPC .... B29K 2105/0038; B29K 2105/0044; B29K 2105/046; B29K 2105/0026; B29K 2027/06; B29K 2995/0015
See application file for complete search history.

(56) References Cited

U.S. PATENT DOCUMENTS

| | | | | |
|---|---|---|---|---|
| 3,698,993 | A * | 10/1972 | Rauh | A23B 7/02 |
| | | | | 181/294 |
| 4,079,107 | A * | 3/1978 | Brunner | C08J 9/06 |
| | | | | 264/50 |
| 4,284,681 | A | 8/1981 | Tidmarsh et al. | 442/101 |
| 4,510,201 | A | 4/1985 | Takeuchi et al. | 428/385 |
| 4,748,777 | A | 6/1988 | Glassco et al. | 52/82 |
| 5,300,533 | A | 4/1994 | Dahl et al. | 521/76 |
| 5,318,835 | A * | 6/1994 | Sawamoto | C09J 7/0217 |
| | | | | 428/317.3 |
| 5,695,870 | A | 12/1997 | Kelch et al. | 428/318.4 |
| 5,965,249 | A * | 10/1999 | Sutton | C08J 9/40 |
| | | | | 248/562 |
| 6,254,956 | B1 | 7/2001 | Kjellqvist | 428/44 |
| 6,838,147 | B2 * | 1/2005 | Burns, Jr. | D06N 7/0086 |
| | | | | 428/313.3 |
| 8,097,658 | B2 | 1/2012 | Rosthauser | 521/103 |
| 8,419,883 | B2 * | 4/2013 | Day | B29C 44/1285 |
| | | | | 156/169 |
| 2001/0031350 | A1 * | 10/2001 | Day | B29C 70/086 |
| | | | | 428/317.9 |
| 2003/0157295 | A1 * | 8/2003 | Burns, Jr. | D06N 7/0086 |
| | | | | 428/95 |
| 2006/0063850 | A1 * | 3/2006 | Kanae | C08J 7/123 |
| | | | | 522/1 |
| 2006/0264523 | A1 | 11/2006 | Lee et al. | 521/99 |
| 2007/0283658 | A1 | 12/2007 | Siewert et al. | |
| 2009/0220762 | A1 | 9/2009 | Hansel et al. | 428/304.4 |
| 2009/0280704 | A1 | 11/2009 | Fort | 441/74 |
| 2010/0266833 | A1 * | 10/2010 | Day | B29C 44/1285 |
| | | | | 428/304.4 |
| 2012/0135221 | A1 | 5/2012 | Weidinger et al. | 428/304.4 |
| 2013/0228392 | A1 | 9/2013 | Iwata et al. | 181/148 |
| 2013/0273308 | A1 * | 10/2013 | Day | B29C 44/1285 |
| | | | | 428/114 |
| 2013/0310471 | A1 | 11/2013 | Becker et al. | 521/73 |
| 2014/0237928 | A1 | 8/2014 | Kieman | 52/506.1 |
| 2014/0343179 | A1 | 11/2014 | Raymond | 521/92 |
| 2016/0088941 | A1 * | 3/2016 | Snowbarger | B32B 15/12 |
| | | | | 211/135 |

FOREIGN PATENT DOCUMENTS

| | | | | |
|---|---|---|---|---|
| JP | 61276835 | A * | 12/1986 | |
| WO | WO 0198064 | | 12/2001 | B29C 70/50 |
| WO | WO 2007019148 | | 2/2007 | A01N 25/16 |

OTHER PUBLICATIONS

"Effect of additives on flexible PVC foam formation" in Journal of Materials Processing Technology 2007.04.123.
'Phthalates and their Altermatives; Health and Emvironmental Conerns' Technical Briefing; Lowell Center for Sustainable Production; table 2 on p. 8 found at: http://www.sustainableproduction.org/downloads/PhthalateAlternatives-January2011.pdf.
'1,2-Cyclohexane dicarboxylic acid diisononyl ester' from Wikepedia found at: https://en.wikipedia.org/wiki/1.2-Cyclohexane_dicarboxylic_acid_diisononyl_ester.

* cited by examiner

Relationship between the Fikentscher K value (DIN 53726-1983) and the molecular weight of PVC polymers.

1 mm

Photo No. 1

Photo No. 2

Most Heat Loss ◄──────► Less Heat Loss

Infra red image taken at -15 degrees Celsius

This is an ICF Construction

-8

-15

This is a Conventional Construction

SYSTEM FOR MANUFACTURE OF FOAM SHEETS RIGIDIZED WITH POLYMER INFILTRATION

This application claims the benefit of Provisional Application No. 62/174,462 filed Jun. 11, 2015, entitled "SYSTEM FOR MANUFACTURE OF FOAM SHEETS RIGIDIZED WITH POLYMER INFILTRATION" which, in turn, claims the benefit of Provisional Application No. 62/172,059 filed Jun. 6, 2015, entitled "SYSTEM FOR MANUFACTURE OF FOAM SHEETS RIGIDIZED WITH POLYMER INFILTRATION" which, in turn, claims the benefit of Provisional Application No. 62/177,656 filed Mar. 20, 2015 entitled "SYSTEM FOR MANUFACTURE OF FOAM SHEETS RIGIDIZED WITH POLYMER INFILTRATION", the disclosures of which are hereby incorporated by reference thereto in their entirety.

FIELD OF THE INVENTION

The present invention relates to manufacture of rigid foam industrial sheets with applications not limited to building materials, such as wall board, tile, lumber, a wide variety of wood and wood related products, and the like; and, more particularly to a system which forms plain or decorative low density high strength high modulus rigid sheets by a high temperature high pressure molding process forming polyvinyl chloride polymer foams that incorporate polymer additives.

DESCRIPTION OF THE PRIOR ART

Decoration boards presently available in the market include, for example, wooden board, particleboard, oriented strand board ("OSB board"), plywood, density board, fiber composite board, PVC foaming board, and fireproof board. Wooden board, OSB board, particleboard, density board, and fiber composite board exhibit very low anti-flaming and fire resistant performance. They are not waterproof or moisture proof and, consequently, enjoy somewhat limited application. Fireproof board is generally a sandwich board with 3 layers. Metal boards (aluminum boards, stainless steel boards, colored iron boards, titanium zinc boards, titanium boards, copper boards, etc.) comprise a metallic surface and bottom layers, and halogen free, anti-flaming inorganic compositions comprising the middle layer. This hot-pressed composite board exhibits good anti flaming and fire resistant performance, but it is heavy, expensive, and is not waterproof.

Numerous prior art patents and disclosures relate to formation of sheet material from polymeric foam. Specifically these polymeric foams are not infiltrated with polymers to produce plain or decorative rigid sheets for use in structural or decorative building materials and other applications.

U.S. Pat. No. 4,284,681 to Tidmarsh, et al. discloses composite sheet material. The composite material comprises a layer of highly-plasticized polyvinylchloride, comprising 15 to 45% of polyvinylchloride and 55 to 85% by weight of a plasticizer, a fibrous backing, and an intermediate layer of a polymeric material between the polyvinylchloride layer and the backing. Various adhesives may be used to stick the composite material to substrates such as walls, ceilings, and floors. If the intermediate layer is not completely impervious to the plasticizer in the highly-plasticized layer, then the adhesive should preferably resist plasticizer migration. This composite material is a coating layer on a structural object, but is by itself not a structural material.

U.S. Pat. No. 4,510,201 to Takeuchi, et al. discloses a polyvinyl chloride resinous molded sheet product. The polyvinyl chloride resinous compositions containing cellular fillers such as Silus Balloon and pearlite and molded products are prepared by subjecting the compositions to heating at an increased pressure. The molded products may be combined with a core layer such as a non-woven fabric and a victria lawn, a foamed layer such as PVC paste resinous foam, and a surface layer such as a non-foamed synthetic resin, and molded into laminated sheet products. Those are made lighter and superior in soundproof and adiabatic effects, bending strength, dry touchness, water resistance, dimensional stability, cold resistance and the like. The sheet product is usable a floor coverings and other applications. This is a multilayer PVC molded sheet and is not a low-density single layer PVC foam.

U.S. Pat. No. 5,300,533 to Dahl, et al. discloses a method for production of crosslinked plastic foam. This method produces foamed cross linked vinyl chloride containing polymer wherein a blowing agent is added to a copolymer produced by a copolymerization of a monomer composition comprising vinyl chloride and glycidyl containing monomer. Foaming of the copolymer occurs by the decomposition products of the blowing agent or decomposition products of reaction from a chemically reactive azodicarbonamide blowing agent with epoxy groups of the copolymer. The glycidyl containing monomer is a glycidyl acrylate or methacrylate or butylacrylate. It is possible to crosslink foamed vinyl chloride polymers through an addition of epoxy groups which are introduced via a copolymer. The crosslinking takes place by help of the decomposition products from the blowing agent. This requires formation of copolymer of vinyl chloride and glycidyl methacrylate to be produced by suspension-, microsuspension-, emulsion- or mass polymerization.

U.S. Pat. No. 5,695,870 to Kelch et al. discloses laminated foam insulation board of enhanced strength. This laminated insulating foam board comprises a panel composed of a plastic foam material thickness of about ¼ inch to about 1 inch; and first and second thermoplastic facer films, each adhered to primary, opposite surfaces of the panel, the facer films being biaxially oriented, the facer films each having a thickness of about 0.35 to about 10.0 mils. The board produced has an ultimate elongation of less than 200 percent in both machine and transverse directions and a yield tensile strength of at least 7,000 pounds per square inch in both machine and transverse directions with a 1 percent secant modulus of at least 200,000 pounds per square inch in both machine and transverse directions. The laminated foam insulation is a panel of extruded polystyrene plastic foam material and is not a polyvinylchloride foam.

U.S. Pat. No. 6,254,956 to Kjellqvist et al. discloses a floor, wall or ceiling covering. This floor, wall or ceiling covering comprises one or more substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s). The floor, wall or ceiling covering has a good balance of properties, such as sufficient flexibility and conformability to uneven or contoured surfaces for efficient application to floors, walls, or ceilings, sufficient scratch resistance, sufficient indentation resistance, indentation recovery and/or sufficient abrasion resistance. The floor, wall or ceiling covering is made by polymerizing one or more polymers. The floor wall or ceiling covering is not a polyvinylchloride foam product made by hot pressing a slurry composition.

U.S. Pat. No. 8,097,658 to Rosthauser discloses a process for the production of medium density decorative molded foams having good fire retardant properties with reduced mold times, fire retardant compositions and foams produced by this process. This fire-resistant, medium density molded polyurethane foam is said to be removed from a mold in substantially shorter times than previously possible. These reduced de-mold times are achieved by including a solid flame retardant composition in the polyurethane foam forming composition. This solid flame retardant composition includes a melamine coated ammonium polyphosphate and zinc borate. The process uses polyurethane foam forming a reactive mixture and is not indicated to be a low-density polyvinylchloride foamed structural material.

U.S. Patent Application No. 20060264523 discloses polyvinyl chloride foams. The polyvinyl chloride foams exhibit improved mechanical strength and non-flammability. Microcellular polyvinyl chloride foams having the closed cell structure have a high foaming efficiency even with a small amount of a foaming agent. The polyvinyl chloride foams comprise vinyl chloride resin-layered silicate nanocomposites in which the layered silicates are dispersed onto the vinyl chloride resins containing foaming agents. The foaming of the composition is accomplished by mechanical action of carbon dioxide injection and the specific gravity of foam formed is very high, greater than 1 gram/cc.

U.S. Patent application No. 20130310471 discloses the use of di (isononyl) cyclohexanoate (DINCH) in expandable PVC formulations. The invention relates to a foamable composition containing at least one polymer selected from the group consisting of polyvinyl chloride, polyvinylidene chloride, polyvinyl butyrate, polyalkyl (meth) acrylate and copolymers thereof. The plasticizer used is diisononyl 1,2-cyclohexanedicarboxylate (DINCH) and diisononyl (ortho) phthalate (DINP) is a plasticizer that has chemical hazards as indicated in the U.S. Consumer Product Safety Commission at https://www.csc.gov/PageFiles/98260/dinp.pdf. The foam former of azodicarbonamide. Foam stabilizer is ZnO which acts as a kicker for the decomposition of azodicarbonamide. The polymeric composition is formed a low viscosity plastisol and has to be applied to a support during over curing. Accordingly, the '471 application does not produce free-standing low density PVC sheets.

Chinese patent application #CN103265776A to Hou Yu Hung Yi-Drain discloses an eco-wood and its preparation method. The ecological wood provides a waterproof, moisture resistant material that does not contain formaldehyde, toluene and other harmful substances. The eco-wood is flame-retardant with small amount of smoke and has ductility, toughness, good impact resistance and acid corrosion resistance. The preparation method for the long life ecological wood comprises the following components by weight: Chlorine vinegar copolymer resin: 60 to 70, Impact modifiers (Nitrile butadiene rubber): 9-11, Plant fiber: 20 to 30, Coupling agent (titanate): 1 to 3, Smoke suppressant: 10-20, Activated Clay: 5-15, Lubricants (polyethylene wax): from 0.5 to 1.5, Activator (ZnO): 4-6, Green flame retardant (ammonium phosphate): 8-10, Thermal Stabilizer (Ca and Zn compounds): 4-8, Odorless crosslinking agent: 0.5 to 1.5, Foaming agent (AC-3000 which is azodicarbonamide): 1 to 5, Desmopressin agent: 1 to 5. The preparation method includes plant fiber pretreatment, kneading mixer, open mill soak, the film machine the film, closed-cell foam mold, cooling stable pattern. The composition of the eco-wood comprises plant fibers and relies for toughness the polyvinylchloride resin which contains polyvinyl acetate and others without the use of plasticizers such as phthalates. The amount of copolymer addition is not specified accordingly, the flexibility of the coo-wood is unclear.

The web page at https://vtechworks.lib.vt.edu/bitstream/handle/10919/42108/McGrane2.pdf?sequence=1&is Allowed=y discloses Vacuum Assisted Resin Transfer Molding of Foam Sandwich Composite Materials. This method relates to resin transfer molding of dry carbon preforms with polymethacrylimide foam cores to produce composite sandwich structures. This disclosure does not produce a polymer sheet hot pressed to produce a rigid plain or decorative structural sheet.

The publication "Effect of additives on flexible PVC foam formation" in Journal of Materials Processing Technology 2007.04.123 discusses the effects of Ca/Zn stearate and organotin heat stabilizers and zeolite, $CaCO_3$, cellulose and luffa flours fillers, and their concentrations (2.5, 5, 10 and 20% by weight) on production of flexible PVC foams by chemical blowing agent. Azodicarbonamide was investigated. The stabilizer decreases the decomposition temperature of azodicarbonamide from 200° C. to PVC processing temperature of 160 to 190 https://en.wikipedia.org/wiki/1,2-Cyclohexane_dicarboxylic_acid_diisononyl_ester 1,2-Cyclohexane dicarboxylic acid diisononyl ester is a plasticizer for the manufacture of flexible plastic articles in sensitive application areas such as toys, medical devices and food packaging. From a chemical point of view it belongs to the group of aliphatic esters. In 2002, BASF started selling 1,2-cyclohexane dicarboxylic acid diisononyl ester under the tradename of Hexamoll DINCH as an alternative for phthalate plasticizers. [3]

http://www.sustainableproduction.org/downloads/PhthalateAlternatives-January2011.pdf

TABLE 2

Alternative Plasticizers

DOS: Dioctyl sebacate, TXIB: 2,2,4-trimethyl 1,3-pentanediol diisobutyrate, TEHPA: Tri(2-ethylhexyl) phosphate, DEHPA: Di(2-ethylhexyl) phosphate, Eastman 168: bis(2-ethylhjexyl)-1,4-benzenedicarboxylate, TETM: Tri-2-ethylhexyl trimellitate, ESBO: Epoxidized soybean oil, DOTP: Dioctyl terephthalate.
DINCH: Di-isononylcyclohexane-1,2-dicarboxylate Based on the foregoing, there exists a need in the art for an easy to use method for manufacturing building materials in the form of plain or decorative rigid structural sheets that exhibit flame resistance, enhanced insulation and mold-free properties.

SUMMARY OF THE INVENTION

The present invention provides a rigid polyvinylchloride based foam sheet that is especially well suited for, but not limited to, building construction. The sheets have a density ranging from 0.12 to 0.66 grams/cc, which is about 10% to 40% of solid flexible PVC (which typically exhibits a density of 1.1 to 1.35 grams/cc). Sheet formed according to subject invention has a very large number of closed microcells ranging in dimension from 10 to 70 micro meters. The cells have a cell wall of polyvinylchloride based polymer. These sheets also have extremely small sized uniformly distributed closed cells of air pockets that enhance thermal insulation properties and provide sound attenuation characteristics. The density of the sheets produced depends on the composition of the PVC resin, mold fill quantity, and the pressure and temperature applied during sheet formation. Also provided is a method for manufacturing rigid polymer porous material sheets.

The method of production of polyvinylchloride based sheets uses ultrafine particles of virgin polyvinyl chloride synthesized by suspension-, microsuspension-, emulsion- or mass polymerization. These PVC particles in stage I are about 4 manometers, agglomerate in stage II to micro granules of 1-2 micrometers and a number of micro granules agglomerate in stage III to a particles ranging typically in size from 100 to 150 micrometers. These ultrafine homopolymer of polyvinylchloride and copolymers of polyvinylchloride with polyvinyl acetate are free flowing and they become raw materials for making the slurry for forming the sheets according to the subject invention. The K value of the PVC polymer used has a value greater than 65 representing a molecular weight greater than 60,000. The amount of polyvinyl acetate present in the copolymer has a strong influence on increasing the flexibility of the final product produced since polyvinyl acetate decreases the hardness, strength and modulus of the final sheet product and is maintained in the range of 2% to 30% of the copolymer.

In order for the final PVC sheet formed to have adequate flexibility, plasticizers need to be incorporated during the sheet formation process. The plasticizers are chemical species, which dissolve into the PVC composition chains and promote flexing at the molecular level by screening or hinge mechanism. A number of plasticizers are known for example, derivatives of phthalic acid such as diisodecyl phthalate, derivatives of phosphoric acid such as tricresyl phosphate, derivatives of adipic acid such as dioctyl adipate and diisodecyl adipate, derivatives of azelaic acid such as dioctyl azelate, derivatives of benzoic acid such as diethylene glyco dibenzoate. epoxy plasticizer, derivatives of citric acid such as tributyl citrate, derivatives of sebacic acid such as dioctyl sebacate, derivatives of trimellitic acid such as trioctyl trimellitate; derivatives of sulfonic acid, fatty acid esters, glycerine derivatives, chlorinated paraffin, chlorinated diphenyls, derivatives of pyromellitic acid and polyester plasticizers. Due to the recently discovered biohazard of phthalates the subject invention uses phthalate-free plasticizers such as diisononyl 1,2-cyclohexanedicarboxylate (DINCH). Other phthalate-free plasticizers are DOS: Dioctyl sebacate, TXIB: 2,2,4-trimethyl 1,3-pentanediol diisobutyrate, TEHPA: Tri (2-ethylhexyl) phosphate, DEHPA: Di (2-ethylhexyl) phosphate, Eastman 168: bis (2-ethylhexyl)-1,4-benzenedicarboxylate, TETM: Tri-2-ethylhexyl trimellitate, ESBO: Epoxidized soybean oil, DOTP: Dioctyl terephthalate. A subsequent reduction of plasticizer incorporation will result in increased rigidity of the sheet.

Formation of a foamed product requires a foaming agent that produces fine pores with the mold PVC based sheet. The foaming agent decomposes at a decomposition temperature producing a large volume of gaseous reaction product. A number of foaming agents for use in foamed PVC production are known and they include for example azodicarbonamide, dinitrosopentamethylenetetramine, p-toluenesulfonyl hydrazide, and 4,4'-oxybis(benzne sulfonyl hydrozide. The preferred foaming agent is azodicarbonamide since it has a decomposition temperature of about 215 to 219° C. This decomposition temperature is slightly greater than the softening temperature of PVC compositions, which is typically in the range of 170 to 190° C. A kicker compound such as ZnO may be used to bring the decomposition temperature of azodicarbonamide to the softening temperature range of PVC resins used.

The PVC particles in the 100 to 150 micrometer range incorporate all the additives, including the plasticizers and foaming agents, and are wetted by water assisted by anionic surfactants or by isopropyl alcohol forming slurry. This slurry is loaded into a mold and heated when it is under pressure between two plates. The drying of the slurry brings the PVC composition particles in close contact with each other due to surface tension and they join together when the softening point of the PVC and at the same time, the foaming agent decomposes and release a large amount of gas creating sa low density PVC foam. The distribution of porosity in the molded PVC sheet is controlled by the particle size of the foaming agent and its distribution in the slurry.

The air cells formed have to be stabilized so that they remain until the polyvinylchloride polymer sets. The stabiles are typically organic or inorganic compounds such as barium/zinc, calcium/zinc or organ tin stabilizers The present invention produces two types of PVC sheets. The first type uses homopolymer of PVC compacted using sufficient diisononyl 1,2-cyclohexanedicarboxylate (DINCH) plasticizer producing a flexible product, yet and does not have any biohazard of phthalates. The second type of PVC uses copolymers of PVC with 2 to 30% polyvinyl chloride. Due to enhanced flexibility of polyvinylacetate containing PVC composition, a lesser amount of diisononyl 1,2-cyclohexanedicarboxylate (DINCH) plasticizer is needed.

Applications of the present invention also contemplate use in aeronautical technologies, including noise cancelling aviation insulating systems. These systems comprise an insulation material, while also uniquely providing enhanced acoustic properties minimize the cabin sound from the exterior of an aircraft. Owing to its physical properties, the subject material is ideal for use as an aircraft thermal/acoustic insulation material. Both thermal and acoustical insulation is required on passenger aircrafts. Historically both functions have been provided by the same material system, which has mostly been fiberglass batting encapsulated in a plastic pillowcase covering. Covering plastics have been predominantly PET (such as polyethylene terephthalate, commonly sold under the trade name Mylar by DuPont), and a lesser quantity of polyvinyl fluoride (PVF), (commonly sold under the trade name Tedlar by DuPont), and a polyimide film (commonly sold under the trade name Kapton by DuPont) has been used. Use of the material of the subject invention provides the ability to replace at least some (if not all) of the material currently used with an innermost layer sheet thereby increasing the thermal properties, while also improving the acoustics within the air plane cabin. What is more, use of the subject material results in cost savings as well as a slight decrease in weight, without being bound by theory, which in turn decreases fuel costs.

Typically, the thermal environment outside an airplane produces fuselage skin temperatures from about −60 F when in-flight at altitude to about +160 F when parked in direct sunlight in the desert. The amount of insulation needed for the air conditioning/heating system to economically produce comfortable cabin temperatures varies with airplane type and location. However, except for a few places such as the crown area over the aft passenger cabin and the lower fuselage area below the passenger floor, acoustic requirements predominate. Therefore, except for those places, the amount of insulation present exceeds that needed for thermal requirements.

Regarding acoustics, the outside noise is generated by aerodynamics and engines. Insulation is used to attenuate outside noise to allow reasonable levels of comfort and verbal communication inside the passenger cabin and flight deck. The acoustic attenuation needed varies from airplane to airplane, but is generally substantial and insulating material of very high acoustic efficiency is used to minimize the amount (weight, volume) required. Fiberglass batting, using a very small fiber diameter, is a highly efficient acoustic attenuator.

Currently, insulation using fiberglass batting will resist fire penetration in lower-intensity thermal environments. Cargo compartments are required to have liners that are fire barriers. In some compartments, the thermal insulation lining the fuselage provides the fire barrier. For these areas, the requirement involves a Bunsen burner test fiberglass batting easily passes. The FAA has released information in press reports that it plans to propose a requirement that insulation be resistant to burn through in an intense thermal environment like that of a fuel-fed fire. All insulation material systems would have to be redesigned to meet this requirement.

Accordingly, the novel material of the subject invention provides improved acoustical, thermal, and fire barrier functions while providing cost savings. As pointed out hereinabove, implementation of the material of the subject invention provides the ability to replace at least some (if not all) of the fiber glass material currently used with an innermost layer sheet near the interior of the cabin. This increases the thermal properties, while also improving the acoustics within the air plane cabin and improving fire retardation. Such improved acoustics create an acoustic cocoon having noise deflection attributes. Any new insulation materials system must not substantially exceed the weight of existing systems, which averages about 0.1 lb/sqft. Glass batting varies from 0.34 to about 1.5 lb/cuft, with lighter weights predominating. Batting thickness is about 5 inches in the crown area, 3 inches along the sides, and 1 inch below the passenger floor. Covering material varies from 0.5 to about 1.5 oz/sqyd, with 0.5 and 0.9 oz/sqyd predominating. Cost savings results as well as a alight decrease in weight, without being bound by theory, which in turn decreases fuel costs.

The material of the subject invention not only exhibits optimal thermal, acoustic and fire retardation properties, but further does not absorb large amounts of water, does not cause or promote corrosion to the aluminum fuselage structure of the air craft, nor is it electrically conductive, or interfere with inspection of the fuselage structure for corrosion, cracks, etc. In fact, the use of the material as a sheet provides an easier viewing of the fuselage than currently utilized plastic bagged fiber glass and other materials, all while providing a cleaner, safer installation with environmentally sound properties.

The production of the rigid polymer porous material, or composite, sheet starts with a mold filled with slurry of polyvinyl chloride based polymer material with plasticizers, foaming agents and other filler ingredient mixed with an aqueous solution with anionic surfactants or isopropyl alcohol. The slurry compacts the liquid portion drains and dried, bringing the polyvinyl chloride fine particles in close contact with each other, forming a film. The content of the mold are pressed under high applied pressure and heating temperature sufficient to soften or melt the polyvinyl chloride composition while at the same time decomposing the foaming agent releasing a large amount of gaseous decomposition products within the mold. This draining step may be unnecessary, since the heating step automatically volatilizes the liquid portion of the slurry. The pressed sheet has a typical density ranging from 15% to 35% and contains fine dimension of air pockets or calls. The mold dimension may be any size, shape or curvature; but is typically as large as 1220 mm×2440 mm with a mold depth of 60 mm. Depending upon the amount of slurry poured into the mold the thickness of the sheet produced varies. For example, 10 kilos of slurry can produce a sheet that is 40 mm (1.57 inch) in thickness. If a 120 mm (4.72 inch) mold is used to produce an 80 mm (3.15 inch) board, then double the amount (20 kilograms) of raw slurry is added to the mold. The mold is then heated when under applied pressure. Changing the mold size will change the final size of board produced. In this process, there is no limit on the size of the sheet produced since it only depends on the size of the mold. The mold and the top plate may have embossed structures that replicate in the finished sheet product producing decorative construction material sheets.

The polymer mixture used for the slurry of the rigid polymer porous sheet material has one or more of PVC (Polyvinyl chloride) and polyvinyl acetate polymers and, in some cases, is a composite sheet also further comprises wood chips and fire retardant chemicals. These polymers melt below 190° C.

In one embodiment, the polymer porous sheet slurry comprises polymer particles with additives as fillers and fire retardant chemicals. The mold with the slurry is optionally drained of the liquid ingredients and the mold is heated to below 190° C. when under applied pressure. The application of pressure and heat consolidates the slurry solid ingredients creating a sheet that is porous with air holes which have fine dimension and the overall density of the sheet product is approximately 10% to 40% of solid polyvinylchloride sheet depending on the pressure and heat applied. The presence of closed cell air pockets enhances the thermal resistance properties of the sheet material and exhibits high R values which are much greater than that available for typical gypsum based construction sheets, plywood, lumber, OSB, fiber board, particle board and the like. The sheets or lumber made by the process of the subject invention create wall boards, wall assembly systems and other construction products that provide improved heat retention to the building envelope, which significantly improves the thermal efficiency of a home or business building by eliminating or greatly reducing the phenomena known as thermal bridging, which occurs in part through a phenomena known as the framing factor. The mold may have decorative features, which are replicated on the surface of the rigid polymer porous material sheet. Impervious decorative sheets such as Formica sheets, aluminum foil, and stainless steel sheet may be used to cover the rigid polymer porous material sheet during the molding step.

In a second embodiment the polymer slurry mixture may be injected into the mold in a manner similar to resin transfer molding and heated to processing temperature.

In a preferred embodiment, the rigid polymer porous material sheet of the present invention, comprises:

1) an oversized mold having the normal length and width of the sheet, but having a height typically twice the thickness of the intended sheet;

2) said mold being injected with a slurry polymer mixture and drained of the liquid ingredients of the slurry, and heated at temperatures to melt the polymers in the polymer mixture;

3) said mold being heated to a temperature below 190° C. when the mold is pressurized compacting the polymer mixture in the mold to a density ranging from 10% to 40% with closed cells of air pockets present within the sheet formed;

4) said mold having decorative markings that are transferred to the molded rigid polymer porous material sheet;

whereby the compaction of the polymer mixture forming a sheet with closed air cells imparts the sheet with thermal resistance and sound attenuation properties, so that the sheets may be used in building construction as well as decorative applications.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1A:
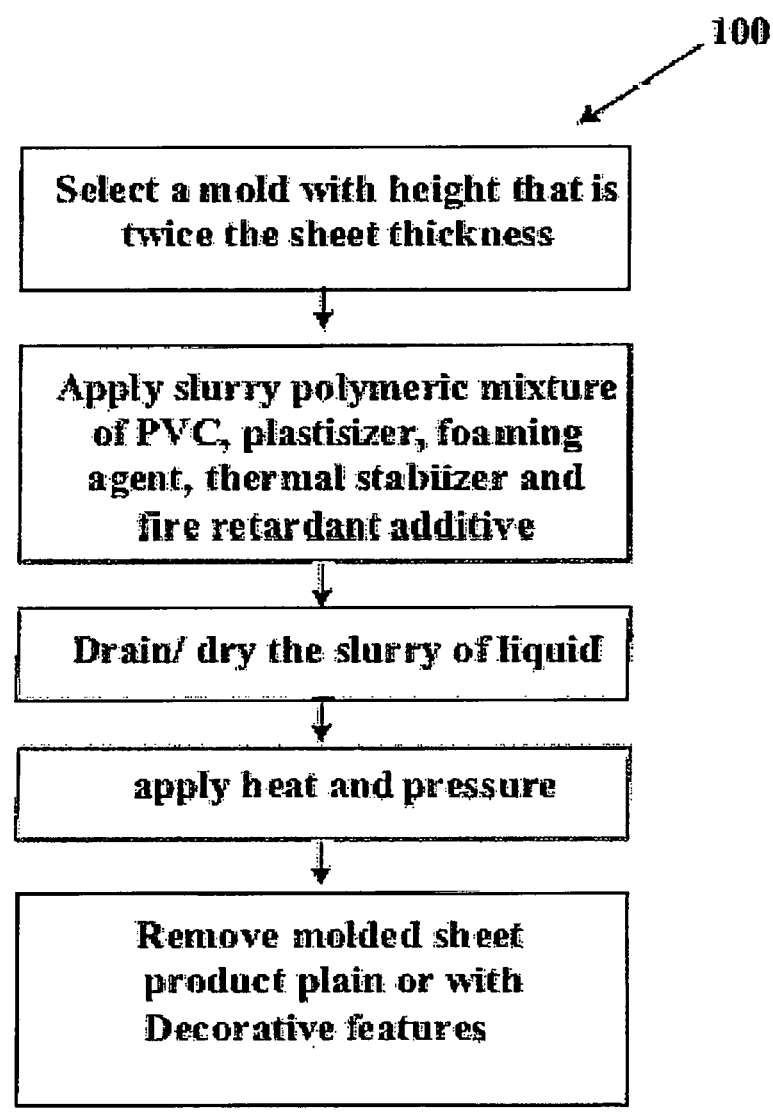
FIG. 1a illustrates the process steps in the manufacture of the rigid polymer porous material sheet.

The polyvinylchloride used in the present invention is in the form of 100 to 150 micrometer particles produced by suspension or emulsion polymerization. The K value of the polyvinylchloride homopolymer or copolymer with polyvinyl acetate has a K value greater than 65 representing a molecular weight of 60,000 as shown in the graph in FIG. 1b, showing a graph reproduced from PVC Plastics by W. V. Titow. A K value of 50 is a low molecular weight soft PVC while a K value of 80 is a high molecular weight strong PVC.

When a plasticizer is added to the fine power of polyvinylchloride based resin, it enters the resin molecule at the atomic level creating screens between polymer chains or hinge locations between polymer chains promoting polymer flexibility. Since the polyvinylchloride foams produced have a very thin polymer layer surrounding the air cell, it requires a great amount of flexibility to prevent crack propagation and fracture. Conventional phthalate plasticizers have been determined to be a biohazard according to U.S. Consumer Product Safety Commission at https://www.cpsc.gov/PageFiles/98260/dinp.pdf. The present invention, accordingly, uses only non-phthalate plasticizers, such as DINCH.

A foaming agent is needed to allow the formation of a plurality of micron sized air cells to produce the low density polyvinylchloride polymeric sheet. When the polymeric composition is heated in a mold, at a specific temperature the polymer softens. If the foaming agent releases a large volume of gaseous decomposition products at the same time when the polyvinylchloride resin softens, a closed mll microcellular structure is formed. While a number of foaming agents are available, their decomposition temperature does not match the softening point of polyvinylchloride resin which is in the range of 170 to 190° C. Specifically, azodicarbonamide foaming agent has a decomposition temperature of 215 to 219° C., but it may be bought down using a ZnO kicker. Using this combination micro fine cells are formed in the low density polyvinylchloride sheet.

Another requirement for the formation of the microcellular sheet during foaming step requires the ultrafine particles of polyvinylchloride particle to touch each other, since the quantity of polyvinylchloride in the sheet is quite small. This is accomplished by mixing the polyvinyl ultrafine particles along with additives with and anionic aqueous solution of isopropyl alcohol forming a slurry. During drying of the slurry, the surface tension brings the polyvinylchloride particles close to each other, forming a film.

The air cells formed have to be stabilized so that they remain until the polyvinylchloride polymer sets. The stabiles are typically organic or inorganic compounds such as barium/zinc, calcium/zinc or organ tin stabilizers The present invention uses two distinctly different low density polyvinylchloride sheets. The first embodiment uses fine particles of polyvinylchloride homopolymer in combination with a higher amount of DINCH non phthalate plasticizer. A typical example of the polymer slurry used in the mold is shown below.

| | |
|---|---|
| Suspension PVC K value 70 (S-PVC) | 100.0 parts |
| Calcium stearate | 1.2 parts |
| Tin stabilizer | 2.0 parts |
| Azodicarbonamide | 8.0 parts |
| Zinc oxide | 1.5 parts |
| Polymethylmethacrylate | 4.8 parts |
| DINCH plasticizer | 15.0 parts |

The second example shown below using a polyvinylchloride copolymer and uses a lesser amount of DINCH plasticizer.

| | |
|---|---|
| Suspension PVC/20% Polyvinylacetate K value 70 (S-PVC) | 100.0 parts |
| Calcium stearate | 1.5 parts |
| Tin stabilizer | 2.0 parts |
| Azodicarbonamide | 8.0 parts |
| Zinc oxide | 1.5 parts |
| DINCH plasticizer | 10.0 parts |

This invention relates to a molding process for producing rigid polymer porous polyvinyl chloride based sheet material, or composite, sheet. Slurry of polymer powder with additives and fillers and fire retardant material is fed to an oversized mold whose height is approximately twice that of the sheet thickness desired while width and the length of the mold are close to that of the desired dimensions of the sheet. The liquid portion of the slurry is optionally drained and dried first and the mold is heated to a temperature below 190° F. when the mold is pressurized by a die set. This application of pressure and temperature forms the sheet with a density ranging from about 5% to 98%, and preferably from about 10% to about 40%, of a solid polyvinyl chloride sheet with closed air cells finely distributed within the sheet. The presence of closed air cells enhances the thermal resistance of the sheet product as well as provide sound absorption characteristics. The die may have milled decorations, which are replicated in the final product.

The rigid polymer porous sheet rated product has a low density, and water does not penetrate the product. The polymer slurry mixture used comprises PVC (Polyvinyl chloride) and polyvinyl acetate polymers along with wood chip and flame retardant additives, depending on the application of the final product. External casing sheets may be used to cover the rigid polymer porous sheet during the heating and pressure application step to bond the encasing sheets thereto. The rigid polymer porous composite sheet is inherently fire retardant due to the usage of PVC in the polymer infiltration composition to release chlorine and expel oxygen near a flame, thereby extinguishing the flame.

The objective of the invention is to create a durable rigid polymer porous sheet, which may be painted and is useful as a building material. The process used herein is very reproducible and produces sheets with exceptional properties. It does not crack when bent 90 degrees or more and is extremely shock absorbing even though it is rigid. Accordingly, the rigid polymer porous sheet is well suited for wall boards, lumber and wall assembly systems.

The rigid polymer filled foam composite is the newest construction material developed as detailed herein. The rigid polymer porous composite sheet is anti-flaming, fireproof moisture proof, anti-corrosion, termite proof; formaldehyde free. It exhibits a low amount of smoke, and is highly resistant to flame penetration. The surface of the sheet can be treated by spray coating, and can be adhered to many kinds of materials. In combination, these features have made the rigid polymer filled foam composite an excellent eco-green construction material.

The rigid polymer porous sheet can be used as a replacement for wooden board; thus reducing deforestation, and protecting the environment. At the same time, it is water proof; moisture proof; sound proof; vibration absorbing, resistant to acid and alkali, resistant to climate ageing, anti-flaming and fire proof. In these aspects, the rigid polymer filled foam material sheet is superior to all other building materials.

Different kinds of materials are added into the rigid polymer filled foam material sheet for different purposes:
1. For wood frame construction, wall, floor, and ceiling assemblies, home decoration and furniture applications, large amount of plant fibers (such as wood chips, husk of rice, etc.) are added, to increase the hardness and nail holding ability;
2. For application in cars, yachts and ships, aircrafts, and bullet trains, and application as embossing materials, thermal preservation materials, nitrile butadiene rubber (NBR) is added to greatly improve its performance of shaping, toughness, and impact resistance, and make it much easier for hot pressing, embossing, bending and carving
3. A smoke suppressant, calcium stearate powder, and flame retardant are added to increase its performance of fire proof and impact resistance, to reduce the density of smoke, and to make it more ecofriendly.
4. This rigid polymer porous sheet is clearly the newest formaldehyde free, eco-green, flame resistant and fireproof building material.

Features and Usages of Rigid Polymer Filled Foam Material Sheet
1. Due to its lightweight, large range of density and flexibility, hard body, and easy installation, it can be used in building material industry as a suitable eco green replacement for wood and engineered wood materials such as but not limited to Framing Lumber, Plywood, Particle board, Oriented strand board (OSB) Type A,B,C, Medium density fiberboard (MDF), High Density fiberboard (HDF), Glued laminated timber (glulam), Laminated veneer lumber (LVL), hardwood, Cross-Laminated Timber (CLT), Structural Composite Lumber (SCL), Laminated strand lumber (LSL), Parallel strand lumber (PSL) 610, Timber, Finger-jointed lumber, High and Medium Density Overlay plywood (HDO and MDO). In such applications as but not limited to subflooring flooring, wall and roof sheathing ceiling and deck sheathing, lumber, timber, rafters, exterior wall studs, purlins, headers, garage door headers, door jams, doors, crown moldings, batten moldings, rim boards, studs, columns, concrete forming, siding, mezzanine decks, and furniture; in addition in transportation industries such as for aircrafts as Aviation thermal acoustic insulation systems, as the roofs, bodies, and core layers of ships, cars, trucks, and trains. Many kinds of materials can be easily adhered to its surface.
2. Due to its good performance of fire resistance and self-extinguishing, it can be used as fireproof doors, fire doors fill core, I Joists (webs and flanges), roof trusses, ridge beams, floor beams, lumber, sheathing board, sauna timber, flooring and furniture for home usages, and in commercial buildings, hotels, and other public areas. It can also be used in framing structures and as the main body of archaizing buildings and temples.
3. Due to its good performance of water-proof and moisture-proof, it can be made into kitchen cabinets, bathroom fixtures, counter tops, and bathroom decoration materials. It is also a good choice for outdoor projects, waterfront facilities, road and bridge projects, and templates for construction projects.
4. Due to its good anti-corrosion and termite proof performance, it is a good choice for industrial anti corrosion projects, industrial containers, industrial tanks, highway panels and archaizing building repairing projects. It is also a good choice as flooring or sub flooring, siding, wall assembly systems, and roof for home usages due to its high R value and waterproof characteristics.
5. As its surface can precede spray treatment, and due to its very low thermal transfer and good thermal preservation, it can be used in walk in/free standing coolers, cold storage insulation board, refrigerated box truck bodies, refrigerated semi-tractor trailers, freezers, and as the internal and external walls for hotels, and other buildings.
6. Due to its excellent insulating and flexibility properties, it can be used as thermal insulation lumber, thermal insulation sheets, thermal insulation board, structural insulated panels, brick or stone insulation panels, exterior insulation blocks, as the bodies of electrical appliances, bodies of outdoor transformers, and circuit insulation boards, etc.
7. The rigid polymer filled foam material sheet is created by hot pressing first followed by cold pressing, and it is easily carved; thus is well suited for use in melamine board, melamine flooring board, melamine cabinet board, polyboard laminate, cabinets, wall and ceiling decoration board, embossed wall and ceiling decoration board, ceiling tiles, ceiling medallions, cloth veneer acoustic soft pack panel, cloth veneer soundproof hard pack acoustic panel advertising boards, office furniture, entertainment centers, embossed leather panel for video wall backdrop screen, and hospital furniture.

Figure 1B:
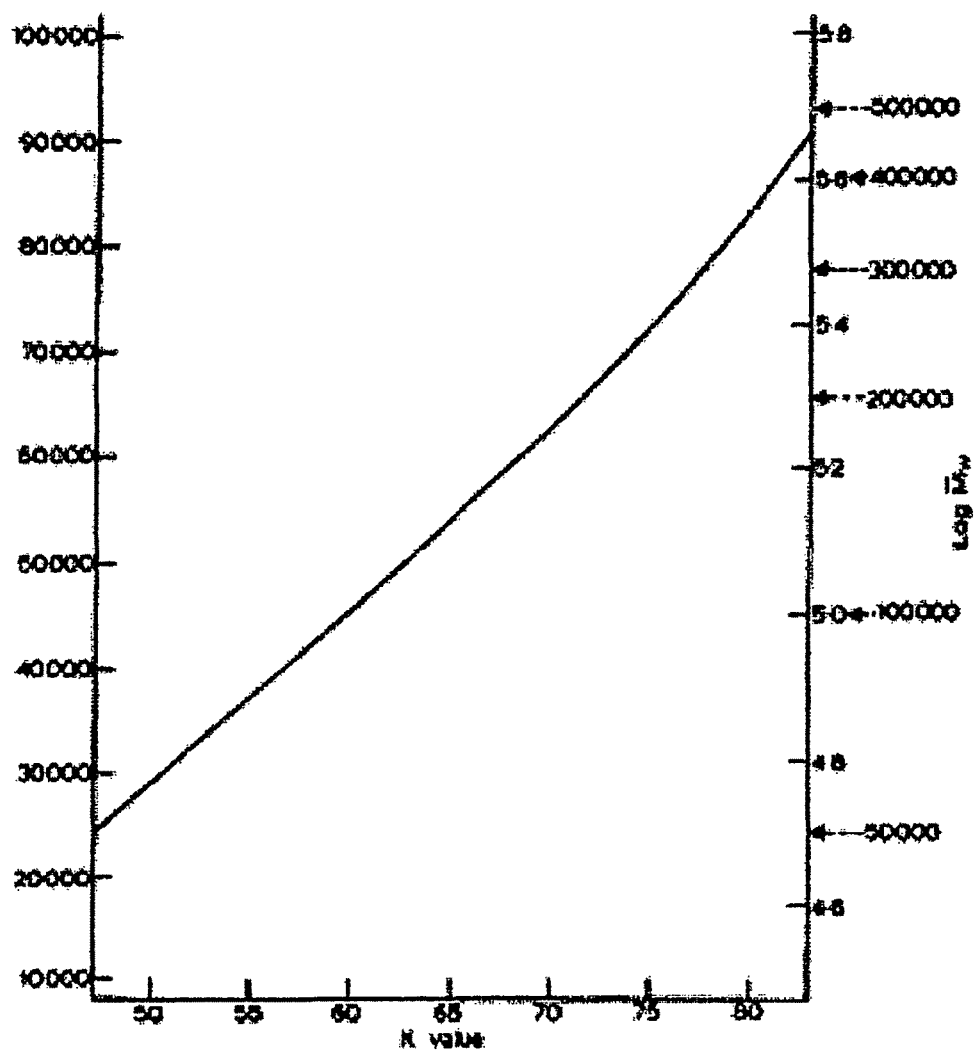
FIG. 1b illustrates a graph showing the relationship between the Fikentscher K value and the molecular weight of PVC polymers.

FIG. 1a illustrates generally at 100 the process steps involved in the creation of the rigid polymer filled foam material sheet. The polyurethane or rubber foam has a plurality of pores, which will be filled with a polymer during the process, as hereinafter described, thereby creating a rigid polymer filled foam material sheet. In the first step, the foam is cut to shape according to the desired product size. In the second step, a mixture of polymers including one or more of ABS (Acrylonitrile Butadiene Styrene), PMMA (Poly methyl methacrylate) and PVC (Polyvinyl chloride) polymers is mixed with a solvent to create a slurry. Additional ingredients may include wood chips, fire retardant materials such as calcium silicate. The foam is completely covered with the slurry and in one embodiment is allowed to dry. In the next step, the polymer covered foam is placed in a die of a heating and pressing machine. Any solvent, if present, is evaporated quickly. ABS melts at about 105° C., PMMA melts at about 165° C., and PVC melts at about 160° C. When the mold is heated to temperatures below 170° C., all the polymeric ingredients are softened. Thus, during the heating process, the polymer slurry composition densifies to a porous sheet structure. When the densification is complete after a selected process time, the rigid polymer porous material sheet may be removed from the mold.

PVC has a large amount of chlorine and when the rigid polymer filled foam material sheet is exposed to flame, the degradation of PVC releases a large amount of chlorine that extinguishes the flame and thereby provides fire retardant properties to the rigid polymer filled foam material sheet.

FIG. 1b illustrates a graph showing the relationship between the Fikentacher K value and the molecular weight of PVC polymers. Preferably, the polyvinylchloride used in the present invention is in the form of 100 to 150 micrometer particles produced by suspension or emulsion polymerization. The K value of the polyvinylchloride homopolymer or copolymer with polyvinyl acetate has a K value greater than 65 representing a molecular weight of 60,000 as shown in the graph below reproduced from PVC Plastics by W. V. Titow. A K value of 50 is a low molecular weight soft PVC while a K value of 80 is a high molecular weight strong PVC.

Figure 2:
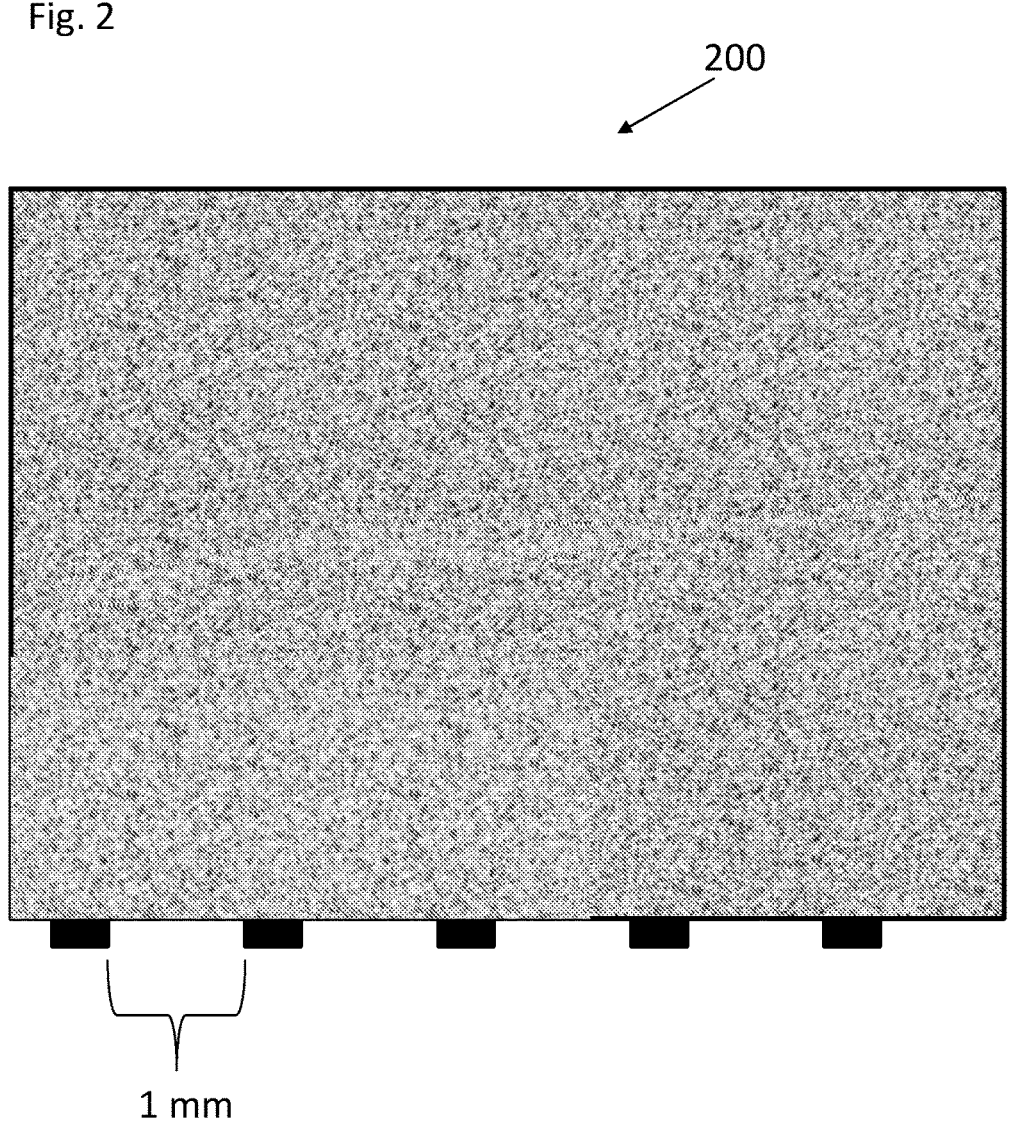
FIG. 2 is a micrograph of the rigid polymer porous material sheet.

FIG. 2 illustrates generally at 200 a micrograph of the rigid polymer porous material sheet. The millimeter marker is shown in the figure. Individual air cells of the porous polymer sheet are clearly seen. This sample is sample A, which had a dimension of 25 cm length. 13 an width and 1.2 an in thickness with a volume of 390 cc and weighed 77 grams. Thus the density of this sample A is 0.197 gm/cc.

Figure 3:
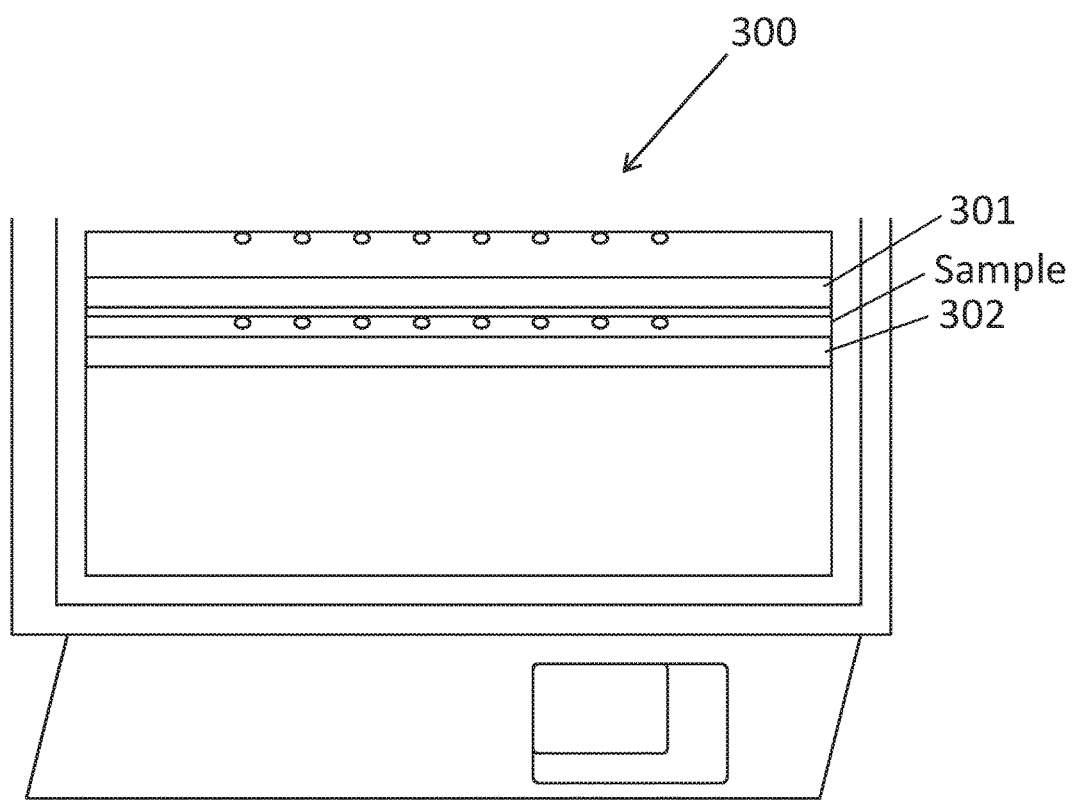
FIG. 3 illustrates thermal resistance or R value measurement procedure.

FIG. 3 illustrates generally at 300 the method used for measuring the thermal conductivity of the sheet. The subject sheet can be made into different hardness for different Industries, and different Industrial end uses and applications. The formula can be adjusted to fit virtually any Industrial application or end use. Heat flow meter testing in accordance with ASTM C518 was conducted on 0.145 gm/cc and 0.165 gm/cc density specimens with varying thicknesses resulting in R values (see below). Chambers 301 and 302 are maintained at different temperatures and heat flow is measured.

| ASTM C518-10 | | .145 gm/cc | .165 gm/cc |
|---|---|---|---|
| R Value | (½"thick) | 2.00 | 1.96 |
| | (¾"thick) | 3.04 | 2.94 |
| | (1"thick) | 4.01 | 3.90 |
| | (1½"thick) | 6.05 | 5.86 |

The subject invention's samples were found to have superior per inch R Value insulation properties to Fiberglass. Yet also exhibits vastly different material properties and attributes.

*Testing Results ASTM C518-10 (above)

The measured thermal properties and the R values of the different thickness specimens are shown as a comparative basis as compared to other commonly available construction materials.

Subject Invention vs. Common Building Material with Identical Thickness R-Value Comparison

| Material: Building/Sheathing Board | Common Building Material Thickness | R-Value | Subject Invention Foaming Board .145 gm/cc R-Value | .165 gm/cc R-Value |
|---|---|---|---|---|
| Gypsum Wall Board | ½" | 0.45 | 2.00 | 1.96 |
| Plywood | ½" | 0.62 | 2.00 | 1.96 |
| Plywood | ¾" | 0.94 | 3.04 | 2.94 |
| Plywood | 1" | 1.25 | 4.01 | 3.90 |
| Fiber board sheathing | ½" | 1.32 | 2.00 | 1.96 |
| Fiber board sheathing | 1" | 2.64 | 4.01 | 3.90 |
| Medium Density Particle Board | ½" | 0.53 | 2.00 | 1.96 |
| Fiberglass sheathing | ¾" | 3.00 | 3.04 | 2.94 |
| Fiberglass sheathing | 1" | 4.00 | 4.01 | 3.90 |
| Fiberglass sheathing | 1½" | 6.00 | 6.05 | 5.86 |

| Material: Insulating Materials (Per 1 inch Thickness) | Thickness | Common Building Material R-Value | Subject Invention Foaming Board .145 gm/cc R-Value | .165 gm/cc R-Value |
|---|---|---|---|---|
| Fiberglass Batt | 1" | 3.14 | 4.01 | 3.90 |
| Fiberglass Blown (Attic) | 1" | 2.20 | 4.01 | 3.90 |
| Fiberglass Blown (Wall) | 1" | 3.20 | 4.01 | 3.90 |
| Rock Wool Batt | 1" | 3.14 | 4.01 | 3.90 |
| Rock Wool Blown (Attic) | 1" | 3.10 | 4.01 | 3.90 |
| Rock Wool Blown (Wall) | 1" | 3.03 | 4.01 | 3.90 |
| Cellulous Blown (Attic) | 1" | 3.13 | 4.01 | 3.90 |
| Cellulous Blown (Wall) | 1" | 3.70 | 4.01 | 3.90 |
| Vermiculite | 1" | 2.13 | 4.01 | 3.90 |
| Autoclaved Aerated Concrete | 1" | 3.90 | 4.01 | 3.90 |
| Urea Terpolymer Foam | 1" | 4.48 | 4.01 | 3.90 |
| Rigid Fiberglass (>4 lb/ft3) | 1" | 4.00 | 4.01 | 3.90 |
| Expanded Polystyrene (Beadboard) | 1" | 4.00 | 4.01 | 3.90 |
| Extruded Polystyrene | 1" | 5.00 | 4.01 | 3.90 |
| Polyurethane (foamed-in-place) | 1" | 6.00 | 4.01 | 3.90 |
| Foil Faced Polyisocyanurate | 1" | 6.00 | 4.01 | 3.90 |

| Material: Siding | Common Building Material Thickness | R-Value | Subject Invention Foaming Board .145 gm/cc R-Value | .165 gm/cc R-Value |
|---|---|---|---|---|
| Hardboard | ½" | 0.34 | 2.00 | 1.96 |
| Plywood | ½" | 0.62 | 2.00 | 1.96 |
| Plywood | ¾" | 0.93 | 3.04 | 2.94 |

|  | Common Building | Subject Invention Foaming Board | |
|---|---|---|---|
| | Material | .145 gm/cc | .165 gm/cc |
| Material: Siding | Thickness R-Value | R-Value | R-Value |
| Wood Bevel Lapped | 0.80 3.04 | 3.04 | 2.94 |
| Aluminum/Steel/Vinyl (not insulated) | 0.61 3.04 | 3.04 | 2.94 |
| Aluminum/Steel/Vinyl (½" insulation) | 1.80 3.04 | 3.04 | 2.94 |

| Material: Interior Finish Materials | Common Building Material | Subject Invention Foaming Board | |
|---|---|---|---|
| | Thickness R-Value | .145 gm/cc R-Value | .165 gm/cc R-Value |
| Gypsum Board (Drywall) | ½" 0.45 | 2.00 | 1.96 |
| Paneling | ¼" 0.31 | 1.00 | 1.00 |
| Paneling | ½" | 2.00 | 1.96 |
| Paneling | ¾" | 3.04 | 2.94 |
| Paneling | 1" | 4.01 | 3.90 |

| Material: Flooring Materials | Common Building Material | Subject Invention Foaming Board | |
|---|---|---|---|
| | Thickness R-Value | .145 gm/cc R-Value | .165 gm/cc R-Value |
| Plywood | ¾" 0.94 | 3.04 | 2.94 |
| Plywood | 1" 1.25 | 4.01 | 3.90 |
| Particle Board (underlayment) | 1" 1.31 | 4.01 | 3.90 |
| Hardwood Flooring | ¾" 0.68 | 3.04 | 2.94 |
| Hardwood Flooring | 1" 0.91 | 4.01 | 3.90 |
| Tile, Linoleum | 0.05 | 2.00 | 1.96 |

| Material: Flooring Materials | Common Building Material | Subject Invention Foaming Board | |
|---|---|---|---|
| | Thickness R-Value | .145 gm/cc R-Value | .165 gm/cc R-Value |
| OSB Insulated Subfloor Panel System | 2" 7.00 | 8.02 | 7.80 |

| Material: Doors | Common Building Material | Subject Invention Foaming Board | |
|---|---|---|---|
| | Thickness R-Value | .145 gm/cc R-Value | .165 gm/cc R-Value |
| Wood Hollow Core Flush | 1¾" 2.17 | 7.05 | 6.84 |
| Wood Solid core Flush | 1¾" 3.03 | 7.05 | 6.84 |
| Wood Solid core Flush | 2¼" 3.70 | 9.02 | 8.80 |
| Insulated metal door (2" w/urethane) | 2" 15.00 | 8.02 | 7.80 |

In all cases, the sheet of the present invention provides better R values as compared to any of the commercially available construction material. The sheet of the present invention is also Fire Proof, Water Proof (water absorption 0.81%), Termite Proof, Sound Proof, Acid Proof, and is the next state of the art Eco Green Building Material comprised of 100% Formaldehyde Free components.

Sound/Acoustic properties are set forth below:

Acoustical Performance Test Report: Density 0.145 gm/cc and 0.165 gm/cc

Tube Diameter: 57 mm

Impedance tube tests were performed on Density 0.145 gm/cc and 0.165 gm/cc samples. Three test specimens were provided for each. Test methods were conducted in accordance with ASTM E1050-12, Standard Test Method for Impedance and Absorption of Acoustical Materials Using a Tube, Two Microphones and A Digital Frequency Analysis System. Instrumentation used is set forth below.

Instrumentation:

| Instrument | Manufacturer | Model | Description | ATI Number | Date of Calibration |
|---|---|---|---|---|---|
| Analyzer | Aglient | 35670A | Environmental Noise Analyzer | Y002929 | June 2013* |
| Microphone One | G.R.A.S | Type 40 AR | ½", pressure type, condenser microphone | 063359 | September 2014 |
| Microphone One Preamp | G.R.A.S | Type 26 AK | ½", preamplifier | Y003251 | September 2014 |
| Microphone Two | G.R.A.S | Type 40 AR | ½", pressure type, condenser microphone | Y003245 | September 2014 |
| Microphone Two Preamp | G.R.A.S | Type 26 AK | ½", peramplifier | Y003248 | September 2014 |
| Microphone Calibrator | Larson Davis | CAL 200 | Pistonphone Calibrator | 065327 | September 2014 |
| Driver | JBL | 2426H | Compression Driver | 005719 | N/A |
| Equalizer | Rane | RPE 228 | Digital equalizer | 005081 | N/A |
| Weather station | Davis | 615 C. | Weather station | Y003257 | July 2014 |
| 57 min Impedance Tube | Architectural Testing, Inc. | N/A | 57 mm Impedance tube with microphone holder, stand, and acrylic sample holder with plunger | 005712 | N/A |

*Now: The calibration frequency for this equipment is every two years per the manufacturer's recommendation.

Signal Processing Parameters:

| | |
|---|---|
| Frequency Resolution | 1600 Lines |
| Frequency Span | 3200 Hertz |
| Averaging Type | RMS |
| Number of Averages | 25 |
| Windowing Function | Hanning Window |
| Overlap | 66.70% |

N/A—Non Applicable

Each specimen was installed flush with the open end of the specimen holder. Any gaps that existed between the specimen and holder were sealed with petroleum jelly. The holder was installed onto the open end of the impedance tube. Random noise was generated in the tube, and measurements were conducted and averaged. The air temperature, relative humidity and atmospheric pressure conditions were monitored and recorded during the test measurements. The results for the specimens were averaged. The r/pc, x/pc, gpc, bpc and the normal incidence sound absorption coefficients were calculated.

Density 0.145 gm/cc:

| Specimen | Description | Thickness (cm) | Weight (g) |
|---|---|---|---|
| A | Foam board | 1.875 | 7.529 |
| B | Foam board | 1.920 | 7.560 |
| C | Foam board | 1.915 | 7.560 |

Density 0.165 gm/cc:

| Specimen | Description | Thickness (cm) | Weight (g) |
|---|---|---|---|
| A | Foam board | 2.017 | 24.012 |
| B | Foam board | 2.019 | 24.591 |
| C | Foam board | 2.019 | 24.560 |

| ASTM E1050 | .145 gm/cc | .165 gm/cc |
|---|---|---|
| Acoustic Absorption | 0.03-0.17 (250-2000 hz) No Absorption | 0.03-0.05 (250-2000 hz) No Absorption |

Density 0.145 gm/cc:

Summary of Test Results

⅓ Octave Normal Incidence Sound Absorption Coefficients at the Octave Band Frequencies

| Data File No. | 63 | 125 | 250 | 500 | 1000 | 2000 | 4000 |
|---|---|---|---|---|---|---|---|
| E7935.01 | N/A | N/A | 0.03 | 0.03 | 0.05 | 0.17 | N/A |

N/A indicates the frequency is not applicable to the respective tube diameter.

Density 0.165 gm/cc

Summary of Test Results

⅓ Octave Normal Incidence Sound Absorption Coefficients at the Octave Band Frequencies

| Data File No. | 63 | 125 | 250 | 500 | 1000 | 2000 | 4000 |
|---|---|---|---|---|---|---|---|
| E7255.01A | N/A | N/A | 0.03 | 0.03 | 0.02 | 0.05 | N/A |

N/A indicates the frequency is not applicable to the respective tube diameter.

Physical properties of the samples were determined, as set forth below 0.145 gm/cc density:

| | |
|---|---|
| ASTM D 635 Rate of Burn | PASS - Failure to sustain burn corresponds to a CC1/HB classification. |
| ASTM C 367 Hardness | 281 LBF Average |
| ASTM C 367 Friability | 0.05 Average Mass Loss |
| ASTM C 367 Sag Test | Average Sag 0.033 Ave Recovery 0.037 |

*conditioning for 17 hours at 32° C. and 90% relative humidity
*6 hour "wet" recovery period at 23° C. and 50% relative humidity

| ASTM C367 Transverse Strength | Machine Direction Average | Cross Direction Average |
|---|---|---|
| Width | 3.082 | 3.085 |
| Depth | 0.0754 | 0.0751 |
| Max Load (lbf) | 33.8 | 32.4 |
| Max Deflection (in) | 3.502 | 3.598 (Maximum range of Testing machine capability) |
| Modulus of Rupture (psi) | 347 | 335 |

The subject foaming boards can be manufactured into standard building board size, and any standard lumber size specification. For example, the molds and machinery to form the foaming boards are typically available in standard size of 1220 mm×2440 mm (48 inch×96 inch). Therefore the variance is the thickness of the mold, which in turn produces different thicknesses of slab. Once the finished slab has been removed from the mold, the board can be cut into building board sizes or lumber sizes according to needs and applications.

Figure 4:
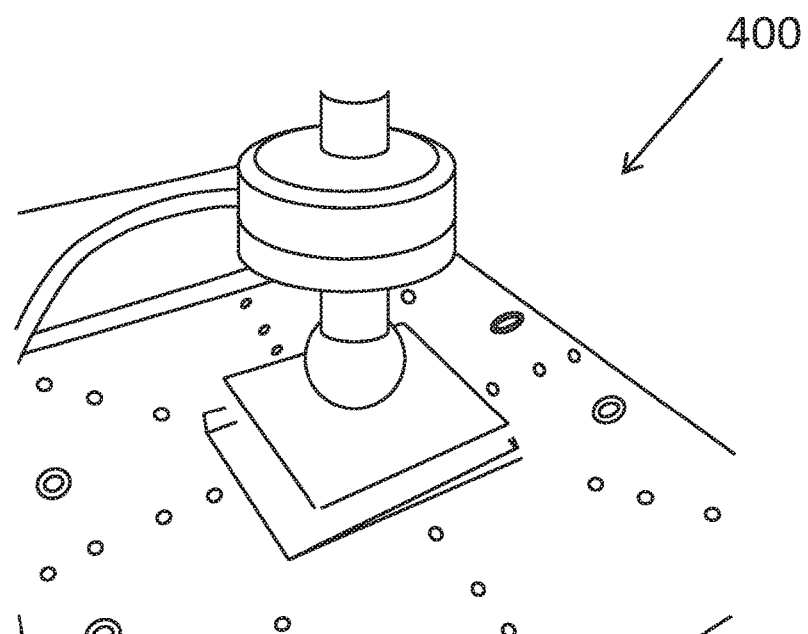
FIG. 4 illustrates hardness measurement of rigid polymer porous sheet.
Figure 4:
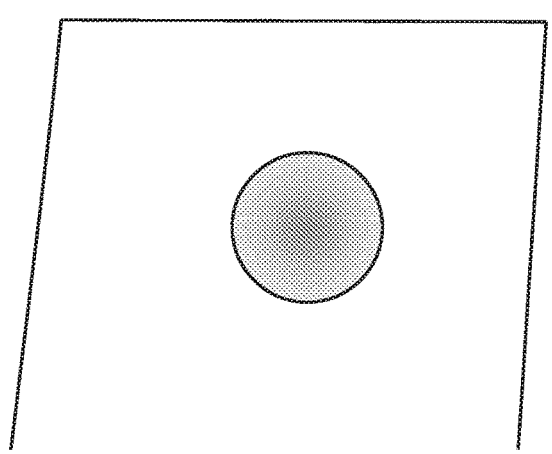

FIG. 4 illustrates at 400 the harness measurement of the rigid polymer porous sheet having 0.145 gm/cc density according to ASTM C 36. The figure shows the test set up and the indentation. Hardness test was conducted on five 4 in. by 4 in. specimen. A compressive load was applied to each specimen utilizing an Instron Universal Testing Machine (ICN: 005741) through a 2 in. diameter ball at a rate of 0.10 in/min until a sample penetration of 0.250 in was achieved.

Hardness Results

| .145 gm/cc density | Thickness (in.) | Hardness (lbf) |
|---|---|---|
| Average | 0.7542 | 281 |

Figure 5:
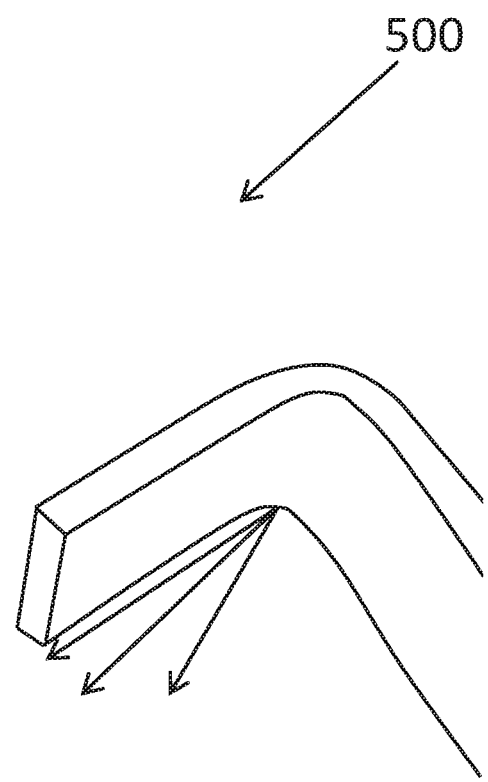
FIG. 5 illustrates bend test measurement of the rigid polymer porous sheet.

ASTM C 367—Transverse Strength tests were conducted. Five, 3 in. by 14 in. by 0.750 in. specimen having a density of 0.145 gm/cc were cut from the submitted panels in a machine direction, and another five were cut in the cross direction. Test specimen dimensions were measured using a 12 inch (by 0.001 inch) digital caliper (ICN: 004722). Specimens were individually mounted in an Instron Model 3369 Universal Testing Machine (ICN: 005740) using a three-point flexural loading setup. Test specimens were supported at a span of 12 in. The diameter of the loading nose and the support rods were 1.25 in. The specimens were loaded at a rate of 0.50 in/min until either peak load was achieved or a deflection of 3.5 in. was reached. As illustrated by FIG. 5, the specimens exhibited excellent flexibility exceeding 110°. Midspan deflection was continuously recorded during the loading process using the crosshead movement of the test machine.

Transverse Strength Results

| MD results | Width (in) | Depth (in) | Maximum Load (lbf) | Maximum Deflection (in) | Modulus of Rupture (psi) |
|---|---|---|---|---|---|
| Average | 3.082 | 0.754 | 33.8 | 3.502 | 347 |

| CD results | Width (in) | Depth (in) | Maximum Load (lbf) | Maximum Deflection (in) | Modulus of Rupture (psi) |
|---|---|---|---|---|---|
| Average | 3.085 | 0.751 | 32.4 | 3.598 | 335 |

ASTM C 367—Friability tests were conducted. Twelve, 1 in. by 1 in. by 0.750 in. specimens were weighed using a Mettler Toledo analytical balance (ICN: 003449) and placed within the oak friability tumbler along with twenty four, ¾" oak cubes. The tumbler was closed to prevent the test materials from being ejected and the tumbler was rotated around its axis at a rate of 60 rpm for 10 minutes. The sample set was then removed from the tumbler and weighed for mass loss. They were then reinserted into the tumbler without the previous debris being removed, and the mechanism operated for 10 additional minutes. At the conclusion of the second 10 minutes, the samples were removed and reweighed, resulting in a final mass loss.

Friability Test Results

| | Initial weight | 10 Minute Weight (g) | Mass Loss (%) | Next 10 min weight(g) | Mass Loss (%) |
|---|---|---|---|---|---|
| Average | 2.1824 | 2.1813 | 0.05% | 2.1801 | 0.11 |

FIG. 5 illustrates at 500 the bending of the rigid polymer porous sheet. The sample is reversibly bent to 110° without cracks. It represents the only building board used for drywall, or wall assembly sheathing that can flex to an angle exceeding 120 degrees and then return to its original shape without any breaking, cracking or exterior flawing in its appearance or rigidity.

Other test samples marked Sample B had a dimension of 25 cm length. 15 cm width and 2 cm in thickness with a volume of 750 cc and weighed 275 grams. Thus the density of this sample B is 0.367 gm/cc. A third sample, Sample C had a dimension of 24.5 cm length. 12 cm width and 0.5 cm in thickness with a volume of 147 cc and weighed 275 grams. Thus the density of this sample C is 0.558 gm/cc. Clearly the rigid polymer porous sheet fabrication process such as the amount of slurry added during molding of the sheet, the temperature of the mold and the pressure applied determines the density. In addition, the presence of decorative structure on the sheet increases both the hardness and the density of the sheet formed.

Wall Assembly Systems—Foaming Board Composite Wall Assembly Systems and Foaming Board Related Products of the subject invention eliminates or greatly reduces "Thermal Bridging" and "Framing Factor" to the wall assembly and achieves a 114.33% increase in R-Value (using California Energy Commission of 25% framing factor) throughout the entire wall assembly system and building envelope creating a thermal break and uniform increase in thermal resistance.

A thermal bridge, also called a cold bridge, is an unwanted path for heat flow that bypasses the main insulation of a building envelope. A thermal bridge is a fundamental of heat transfer where a penetration of the insulation layer by a highly conductive or non-insulating material takes place in the separation between the interior (or conditioned space) and exterior environments of a building assembly (also known as the building enclosure, building envelope, or thermal envelope). Placing a good conductor in parallel with good insulation is often referred to as "thermal bridging" because it provides a path for heat flow that bypasses the main insulation.

Energy loss inside the building envelope occurs by two forces conduction and convection. Conduction is the transfer of heat through a solid material, which is what insulation is designed to prevent, and is responsible for 60 percent of heat or cooling loss in the average home. Convection is the transfer of air through gaps in the walls and roof of the home. Outside air leaking into the home or air infiltration, is responsible for 40 percent of heat or cooling loss in the average home.

Wood-framed homes rely on dimensional lumber, referred to as studs, at regular intervals to provide structural support. Lumber is a very poor insulator and forms a thermal bridge from the outside of the home to the inside of the home where heat can pass through by conduction. Door Framing, steel studs, and wood or metal window frames are also common thermal bridges.

Insulation around a thermal bridge is of little help in preventing heat loss or gain due to thermal bridging; the bridging has to be eliminated, rebuilt with a reduced cross-section or with materials that have better insulating properties, or with a section of material with low thermal conductivity installed between metal components to retard the passage of heat through a wall or window assembly, called a thermal break.

Figure 6A:
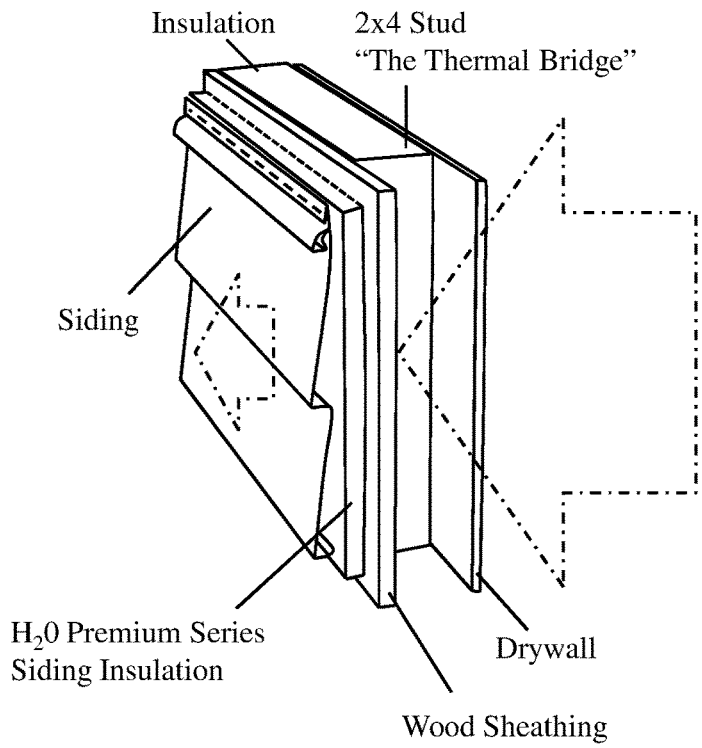
FIG. 6a illustrates the thermal bridge.
Figure 6B:
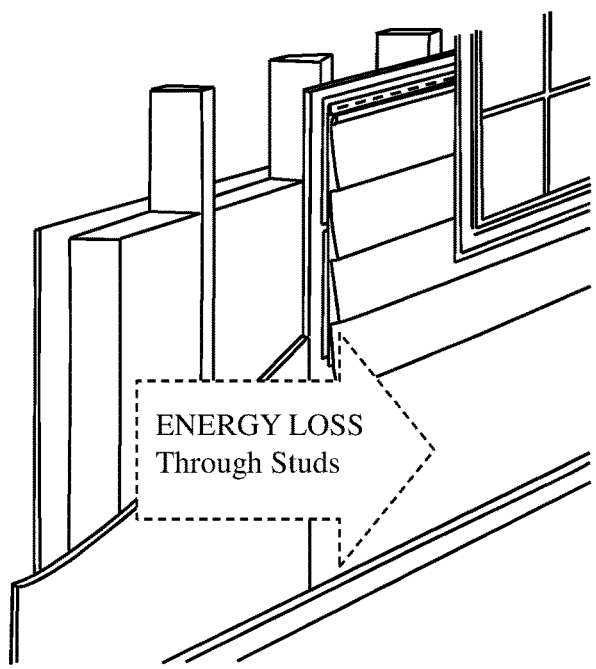
FIG. 6b illustrates the energy lost through studs.
Figure 7A:
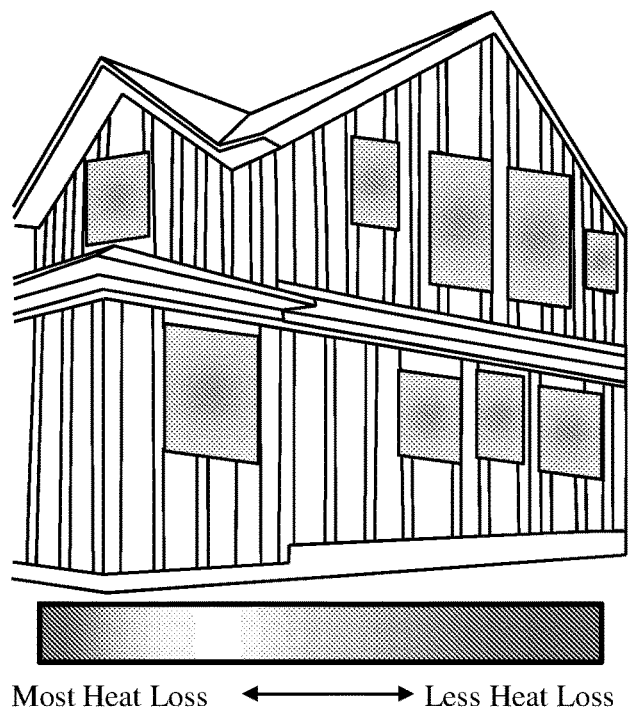
FIG. 7a illustrates the framing factor concept.
Figure 7B:
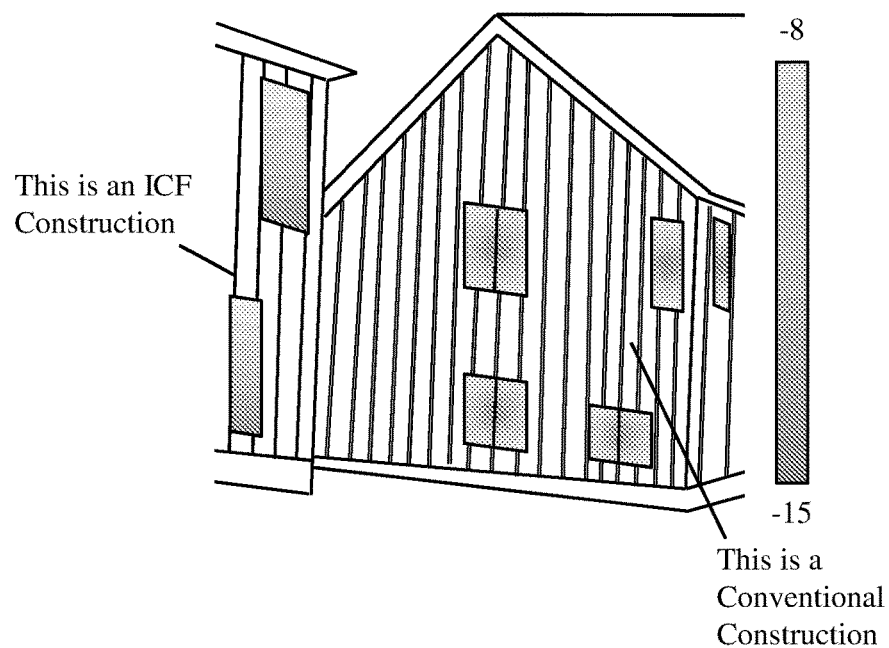
FIG. 7b illustrates the framing factor concept with an IR image.
Figure 8:
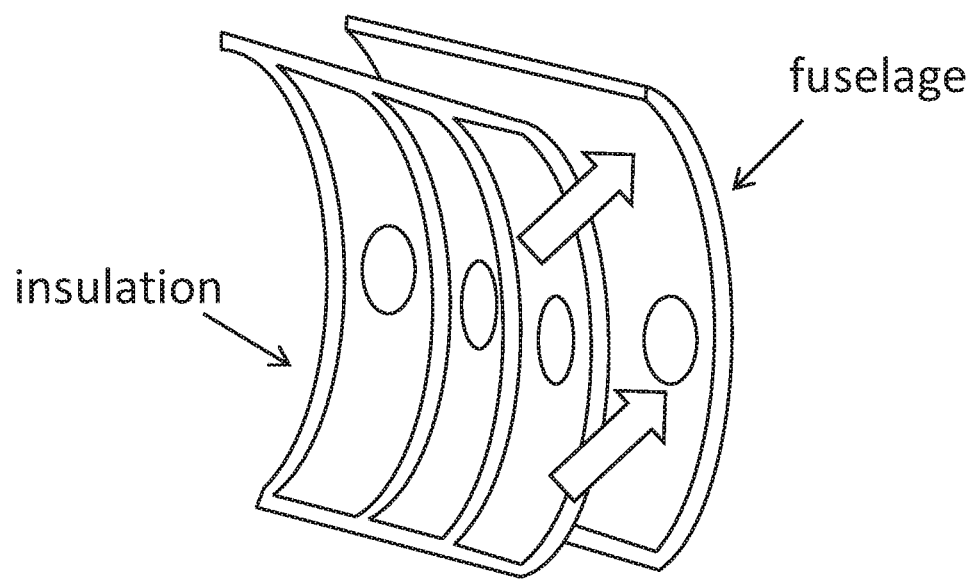
FIG. 8 illustrates an embodiment of the invention wherein the rigid polymer porous material sheet is used in an aviation acoustic thermal insulation system.
Figure 9:
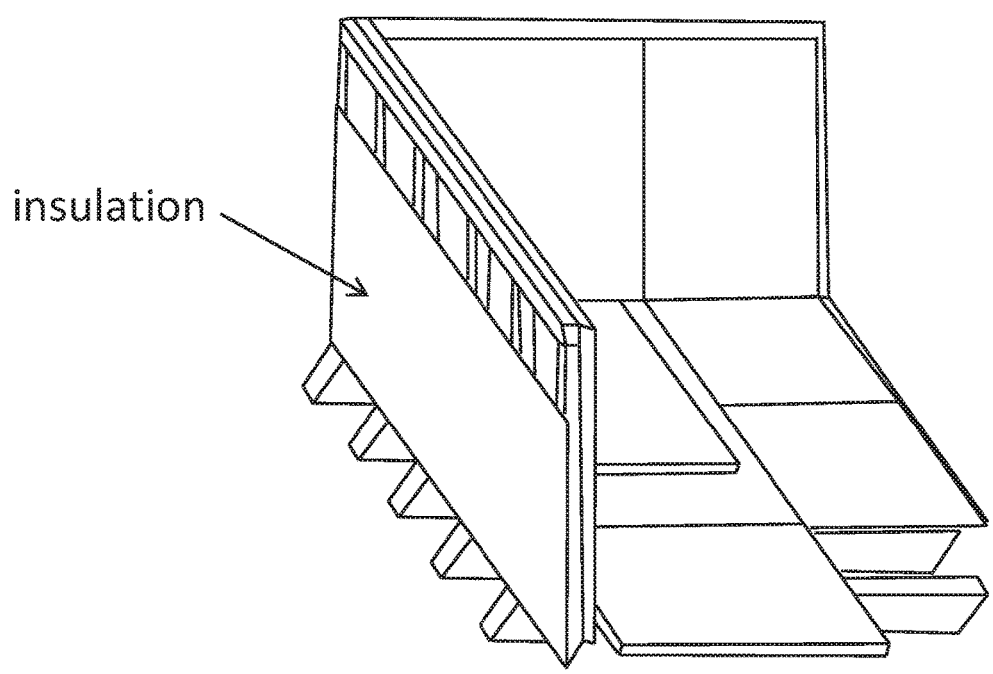
FIG. 9 illustrates a framed structure wherein a humidity expansion gap of ⅛" has been eliminated.

FIGS. 6a and 6b illustrate the thermal bridge and energy lost through studs. FIGS. 7a and 7b illustrate the framing factor concept.

Foaming Board Composite Wall Assembly Systems and Foaming Board related products comprising the subject inventive material create a thermal break in the thermal bridging occurring in wall assemblies of the building envelope resulting in a 114.33% increase in R-Value wall assembly system and building envelope. (See Wall Assembly R-Value Below).

Calculating Assembly Wall R-Value* (Standard 2×4 Wall Assembly)

*This example is just for wood frame construction. Steel studs are a more complex calculation Formula: Assembly R-Value–1/(Assembly U-Value)–1/(U-studs x %+U-cavity x %)

| | Common Building Material | | | Subject Invention | | |
|---|---|---|---|---|---|---|
| component | R-Value Studs | R-Value Cavity | Assembly R-Value | R-Value Studs | R-Value Cavity | Assembly R-Value |
| Wall-Outside Air Film (Winter) | 0.17 | 0.17 | | 0.17 | 0.17 | |

-continued

| component | Common Building Material | | | Subject Invention | | |
|---|---|---|---|---|---|---|
| | R-Value Studs | R-Value Cavity | Assembly R-Value | R-Value Studs | R-Value Cavity | Assembly R-Value |
| Siding - Wood Bevel | 0.80 | 0.80 | | 3.96 | 3.96 (½".145 gm/cc + ½" .165 gm/cc) | |
| Plywood Sheathing (½) | 0.63 | 0.63 | | 3.93 | 3.93 (1" thick .165 gm/cc) | |
| 3½ Fiberglass Bart | | 13.00 | | | 13.00 | |
| 3½" Stud | 4.38 | | | 13.65 | (3.5" × 3.90 .165 gm/cc) | |
| ½" Drywall | 0.45 | 0.45 | | 3.96 | 3.96 (1"thick .165 gm/cc) | |
| Inside Air Film | 0.68 | 0.68 | | 0.68 | 0.68 | |
| Percent for 16"O.C. + Additional Studs | 25% | 75% | | 25% | 75% | |
| Total Wall Component R-Value | 7.11 | 15.73 | | 26.35 | 25.70 | |
| Wall Component U-Value | 0.1406 | 0.0636 | | 0.0379 | 0.0389 | |
| Total Wall Assembly R-Value | | | 12.07 | | | 25.87 |

(California Dept. Energy 25% framing factor)

| California Energy Commission (25% Framing Factor) | Standard Wall R-Value | Subject Invention R-Value | Percent increase in Wall Assembly R-Value |
|---|---|---|---|
| | 12.07 | 25.87 | 25.87 − 12.07 = 13.80 (13.80/12.07) × 100 = 114.33% |

* Foaming board wall assembly systems using the subject inventive material result in an increase in total wall assembly R-value from 12.07 to 25.87 which is an increase of 114.33%.

The foaming board composite wall assembly systems and foaming board related products of the subject invention eliminates or reduces to a measurable insignificant fraction thermal bridging and framing factor in the building envelope by applying its composite materials with superior industry leading R-Values to achieve a uniform thermal resistance throughout the entire wall assembly system.

The term "framing factor" is widely used to express a percent of the total wall area occupied by framing members. The extent to which a wall, roof or floor's framing reduces the R-value of its insulation is called its "framing factor". It is simply a percentage reduction in R-value when thermal bridging occurs and a heal flow is created by conduction through the wood or steel frame of a building envelope. The more framing members in a wall structure, the higher the framing factor. Steel stud assemblies often have framing factors of 50% and above, while wood framing is usually closer to 25%. For example, a wall with R-20 insulation and a framing factor of 25% would have an overall insulation value of R-15.

According to a 2002 Report framing factors up to 27% can be found in residential walls in California in 2001. In 2003 a study by ASHRAE found an average of 25% framing factor for U.S. Homes. The result of these studies demonstrated significant sensitivity in some configurations of residential walls to the framing factor and insulation imperfections.

In keeping with the Energy modal Engineering report for the California Energy Commission, ALL wall assemblies in this report have framing factors of approximately 27% (1). It is well known that a presence of framing members (like wood or steel profiles) reduces the R-Value of a wall system. The measure of this effect is known as the framing factor coefficient 'F' of a wall, which is calculated using the following simple expression that contains clear-wall R-Value, Rcw, and the center-of-cavity R-Value, R n: $f=[1-Rcw/Rn]*100$.

The subject invention density 0.145 gm/co is the only building board that can flex to an angle exceeding 130 degrees and then return to its original shape without any breaking, cracking or exterior flawing in its appearance or rigidity. (0.145 gm/cc density) Some concrete flexible cement board is available on the market. However, flexible cement board can only flex approximately 20 degrees and is not a thermal insulator. Foaming Board of the subject invention is the leading insulator with a multitude of applications and flexibility that is unmatched in the building material industry.

Eagle America Framing System—Common Wood and Engineered lumber are specifically prone to humidity induced water absorption resulting in Buckling, Crowning, and Cupping of panels and flooring when no space for humidity expansion is allotted for. Light-frame construction using "platform framing" and standardized dimensional lumber has become the dominant construction method in North America. Such light-frame structures usually gain strength from rigid panels (plywood and other plywood-like composites such as oriented strand board (OSB). However, due to humidity swelling properties of common and engineered wood, a "⅛" installation gap allowance for wood swelling" must be inserted between panels when installing subfloors, floors, walls, ceilings, and roofs in the framed structure.

The present invention was humidity conditioned under ASTM C 367 humidity test for 17 hours at 32° C. and 90% relative humidity, and then a 6 hour "wet" recovery period at 23° C. and 50% relative humidity at 145.28 kg/m3 density. Resulting in deflection of 0.033 of an inch at 90% humidity, and recovery of 0.037 of an inch when reduced to 50% relative humidity.

The present invention's minimal water absorption is in direct opposition to common and engineered wood building material attributes, and eliminates the need for the "⅛" installation gap allowance for wood swelling between panels when installing subfloors, floors, walls, ceilings, and roofs in a framed structure, and eliminates subsequent building defects associated with humidity swelling.

The elimination of the "⅛" gap creates an entirely new method of framing construction, and is known as "The Eagle America Framing System."

The "Eagle America Framing System" of present invention differentiates itself from common building materials, and standard "platform" framing construction by elimination of the ⅛" gap allowance for wood swelling. When assembled in accordance with present invention, said panels can be butted flush against each other increasing the overall structural stability. In addition, the system effectively seals the structure from moisture, air penetration and natural air drafts, eliminates pest pathways, increases the overall strength of the framed structure, and eliminates or reduces to a measurably insignificant fraction energy loss from thermal bridging due to (i) the elimination of the ⅛" gap, and (ii) the increased thermal insulation properties of present invention in sheet or lumber form verses common wood and wood related building materials.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A rigid polyvinylchloride based polymer porous material sheet, comprising:
   a) a polymer mixture of ultrafine particles of polyvinylchloride, a non-phthalate plasticizer, a foaming agent that has a decomposition temperature very close to the softening point of said ultrafine particles of polyvinylchloride, and a thermal stabilizer;
   b) said rigid polyvinylchloride based polymer porous material sheet being plain or having decorative structure;
   c) said rigid polyvinylchloride based polymer porous material sheet having approximately 0.16 to 0.66 grams/cc or overall density of about 10% to 40% of solid PVC;
   d) closed cell air pockets uniformly distributed throughout said rigid polyvinylchloride based polymer porous material sheet;
   whereby said closed cell air pockets provide enhanced thermal resistance and sound attenuation properties for use in building construction, aviation or other industries, and decorative applications.

2. The rigid polyvinylchloride based polymer porous material sheet as recited by claim 1, wherein said polyvinylchloride based composition of ultrafine particles comprises polyvinyl acetate in amounts ranging from 2 to 30%.

3. The rigid polyvinylchloride based polymer porous material sheet as recited by claim 1, wherein said non phthalate plasticizer is diisononyl 1,2-cyclohexanedicarboxylate (DINCH).

4. The rigid polyvinylchloride based polymer porous material sheet as recited by claim 1, wherein said foaming agent is azodicarbonamide.

5. The rigid polyvinylchloride based polymer porous material sheet as recited by claim 1, wherein said slurry has propyl alcohol wetting said ultrafine particles.

6. The rigid polyvinylchloride based polymer porous material sheet as recited by claim 1, wherein said slurry has anionic surfactant in an aqueous medium wetting said ultrafine particles.

7. The rigid polyvinylchloride based polymer porous material sheet as recited by claim 1, wherein said polymer mixture additionally includes wood chip and fire retardant chemicals.

8. The rigid polyvinylchloride based polymer porous material sheet as recited by claim 7, wherein said fire retardant chemical is calcium silicate.

9. The rigid polyvinylchloride based polymer porous material sheet as recited by claim 1, said sheet being suitable for use as a wall board, sheathing board, interior finishing board, subflooring, flooring, wall and roof sheathing, ceiling and deck sheathing, lumber, timber, rafters, exterior wall studs, purlins, headers, ridge beams, floor beams, garage door headers, I Joists (webs and flanges), roof trusses, door jams, doors, crown moldings, batten moldings, rim boards, studs, columns, concrete forming, siding, sauna timber, furniture, office furniture, entertainment centers, mezzanine decks, melamine board, melamine flooring board, melamine cabinet board, polyboard laminate, cabinets, furniture, ceiling tiles, ceiling medallions, cloth veneer acoustic soft pack panel, cloth veneer soundproof hard pack acoustic panel, wall and ceiling decoration board, embossed wall and ceiling decoration board, bathroom fixtures, counter tops, fire doors fill core, embossed leather panel for video wall backdrop screen, marine and boat applications, automotive and train applications, industrial containers, industrial tanks, refrigerated box truck bodies, refrigerated tractor trailer, Aviation thermal acoustic insulation systems, framing structures and in wall assembly systems due to its increased thermal insulation properties and bend properties.

10. The method of forming rigid polymer porous material sheet as recited in claim 9 wherein the polymer slurry is dried after being fed to the mold and prior to application of heat and pressure.

11. A wall assembly system comprising the rigid polymer porous lumber formed by the method of claim 9.

12. The rigid polyvinyl chloride based polymer porous material sheet as recited by claim 1, said sheet being suitable for use as a flooring material, thermal insulation lumber, thermal insulation sheets, thermal insulation board, brick or stone insulation panels, exterior insulation blocks, structural insulated panels, walk in/free standing coolers, cold storage insulation board, and siding due to its increased thermal insulation properties.

13. The rigid polyvinyl chloride based polymer porous material sheet as recited by claim 1, said sheet being suitable for use as a building board or lumber due to its increased strength, bend capability and thermal insulation properties.

14. The rigid polyvinylchloride based polymer porous material sheet as recited by claim 1, said sheet being suitable for use as a door, highway panels, and in window and door framing due to its increased strength, bend capability, paintability and thermal insulation properties.

15. A wall assembly system comprising the rigid polymer porous material sheet recited by claim 1.

16. A wall assembly system comprising the rigid polymer porous material sheet as recited by claim 1, wherein said sheet has a thickness ranging between ½-1 ½ and an R-Value ranging between 1.96 to 6.05.

17. A wall assembly system comprising the rigid polymer porous material sheet as recited by claim 1, wherein said sheet is used in aeronautic acoustic thermal insulation systems.

* * * * *